(12) United States Patent
Anzenberger et al.

(10) Patent No.: US 10,688,518 B2
(45) Date of Patent: Jun. 23, 2020

(54) METHOD OF MANUFACTURING A VIBRATABLE HEAD FOR AN AEROSOL GENERATOR AND VIBRATABLE HEAD FOR AN AEROSOL GENERATOR

(71) Applicant: PARI Pharma GmbH, Starnberg (DE)

(72) Inventors: Hans-Lukas Anzenberger, Munich (DE); Nicole Brune, Germering (DE); Durdica Benko, Munich (DE)

(73) Assignee: PARI Pharma GmbH, Starnberg (DE)

( * ) Notice: Subject to any disclaimer, the term of this patent is extended or adjusted under 35 U.S.C. 154(b) by 101 days.

(21) Appl. No.: 15/749,847

(22) PCT Filed: Aug. 3, 2016

(86) PCT No.: PCT/EP2016/068523
§ 371 (c)(1),
(2) Date: Feb. 2, 2018

(87) PCT Pub. No.: WO2017/021441
PCT Pub. Date: Feb. 9, 2017

(65) Prior Publication Data
US 2018/0221906 A1    Aug. 9, 2018

(30) Foreign Application Priority Data

Aug. 3, 2015  (EP) .................................... 15179487

(51) Int. Cl.
*B05B 17/00* (2006.01)
*B05B 17/06* (2006.01)
(Continued)

(52) U.S. Cl.
CPC ...... *B05B 17/0646* (2013.01); *B05B 17/0653* (2013.01); *B23K 26/0006* (2013.01);
(Continued)

(58) Field of Classification Search
CPC ............ B05B 17/0646; B05B 17/0653; B23K 26/0622; B23K 26/352; B23K 26/3584;
(Continued)

(56) References Cited

U.S. PATENT DOCUMENTS

| 2011/0168807 A1* | 7/2011 | Pollard | .................. B41J 2/1607 |
| | | | 239/102.2 |
| 2014/0110500 A1* | 4/2014 | Crichton | ............. B05B 17/0646 |
| | | | 239/102.2 |
| 2014/0336618 A1 | 11/2014 | Wilkerson et al. | |

FOREIGN PATENT DOCUMENTS

DE   10 2005 006 375 A1   8/2006
EP       3 413 959 A1     12/2008
(Continued)

OTHER PUBLICATIONS

International Search Report and Written Opinion dated Nov. 17, 2016 in connection with International Application No. PCT/EP2016/068523.

(Continued)

*Primary Examiner* — Steven J Ganey
(74) *Attorney, Agent, or Firm* — Wolf, Greenfield & Sacks, P.C.

(57) ABSTRACT

The invention relates to a method of manufacturing a vibratable head (1) for an aerosol generator (2), the vibratable head (1) comprising a support member (4), a vibratable membrane (6) supported by the support member (4) and a vibrator (8) configured to vibrate the vibratable membrane (6). The method comprises the steps of providing the support member (4), roughening a surface portion (10) of the support member (4) by laser structuring, applying an adhesive (9) to at least a part of the roughened surface portion (10) of the support member (4) and attaching at least one element to the support member (4) by at least a portion of the adhesive (9). Further, the invention relates to a vibratable head (1) manu- (Continued)

factured by this method, an aerosol generator (2) comprising such a vibratable head (1) and a method of manufacturing such an aerosol generator (2).

13 Claims, 7 Drawing Sheets

(51) Int. Cl.
| | | |
|---|---|---|
| *B23K 26/00* | (2014.01) | |
| *B23K 26/0622* | (2014.01) | |
| *B23K 26/352* | (2014.01) | |
| *B23K 26/36* | (2014.01) | |
| *B23K 101/20* | (2006.01) | |
| *B23K 101/36* | (2006.01) | |
| *B23K 103/04* | (2006.01) | |
| *B23K 103/10* | (2006.01) | |
| *B23K 103/00* | (2006.01) | |

(52) U.S. Cl.
CPC ........ *B23K 26/0622* (2015.10); *B23K 26/352* (2015.10); *B23K 26/3584* (2018.08); *B23K 26/36* (2013.01); *B23K 2101/20* (2018.08); *B23K 2101/36* (2018.08); *B23K 2103/04* (2018.08); *B23K 2103/05* (2018.08); *B23K 2103/10* (2018.08); *B23K 2103/42* (2018.08); *B23K 2103/52* (2018.08)

(58) Field of Classification Search
CPC ............... B23K 26/0006; B23K 26/36; B23K 2101/20; B23K 2101/36; B23K 2103/10; B23K 2101/42; B23K 2101/04; B23K 2101/05; B23K 2101/52
USPC ....................... 239/4, 102.1, 102.2, 600, 596
See application file for complete search history.

(56) References Cited

FOREIGN PATENT DOCUMENTS

| | | |
|---|---|---|
| EP | 2 624 967 A1 | 8/2013 |
| EP | 3 127 616 B1 | 10/2017 |
| WO | WO 2012/046220 A1 | 4/2012 |
| WO | WO 2015/091564 A1 | 6/2015 |

OTHER PUBLICATIONS

International Preliminary Report on Patentability dated Feb. 15, 2018 in connection with International Application No. PCT/EP2016/068523.

\* cited by examiner

METHOD OF MANUFACTURING A VIBRATABLE HEAD FOR AN AEROSOL GENERATOR AND VIBRATABLE HEAD FOR AN AEROSOL GENERATOR

CROSS REFERENCE TO RELATED APPLICATIONS

This application is a national stage of PCT/EP2016/068523, filed Aug. 3, 2016, which claims priority to EP 15179487.2, filed Aug. 3, 2015, the contents of which are hereby incorporated by reference in their entirety.

FIELD OF THE INVENTION

The invention relates to a method of manufacturing a vibratable head for an aerosol generator, the vibratable head comprising a support member and a vibratable membrane supported by the support member, and to a vibratable head manufactured by this method. Further, the invention relates to an aerosol generator comprising the vibratable head and to a method of manufacturing this aerosol generator.

BACKGROUND ART

Aerosols for therapeutic purposes are generated and delivered to a desired location within a user's or patient's body with aerosol delivery devices. A fluid or liquid (i.e., medicament) to be aerosolised or nebulised is supplied to an aerosol generator of the aerosol delivery device, the fluid or liquid is aerosolised or nebulised by the aerosol generator and the resultant aerosol is supplied to the user or patient.

The fluid or liquid may be aerosolised or nebulised in the aerosol generator by a vibratable head. The properties of the vibratable head of the aerosol generator are of paramount importance for the quality of the generated aerosol and the accuracy of the aerosol dosage. At the same time, the vibratable head is also generally very sensitive. Deviations in the structure or the arrangement of the vibratable head may adversely affect the oscillatory or vibrating motion of the head during aerosol generation and thus compromise the quality of the generated aerosol and the aerosol dosage accuracy.

An aerosol generator of this vibratable head type is disclosed in DE 10 2005 006 375 A1. In particular, DE 10 2005 006 375 A1 discloses an aerosol generator for inhalation therapy devices in which an oscillatable assembly, consisting of at least a membrane and an oscillation generator, is mounted in an encapsulating means.

Vibratable heads are known which comprise a support member and a membrane supported by the support member. One or more elements of the vibratable head may be secured to the support member, e.g., by an adhesive joint. In order to improve the durability of such an adhesive joint, a portion of the support member to which the adhesive is to be applied may be roughened. To date, this surface roughening has been achieved by sandblasting.

However, roughening a portion of the support member of the vibratable head by sandblasting presents numerous problems. For one thing, this process is laborious and time-consuming, further requiring the additional steps of cleaning and drying the support member before the application of an adhesive. For another thing, the sandblasting step has to be performed manually, resulting in undesired deviations or variations in the obtained surface structures, and cannot be integrated into a production line. Moreover, even if sandblasting masks are used, a well-defined and sharp delimitation of the roughened surface area is difficult if not impossible to achieve. Further, such masks are prone to abrasive wear and thus have to be replaced on a regular basis.

Hence, there remains a need for a method of manufacturing a vibratable head which allows for the vibratable head to be fabricated in an efficient and precise manner.

The process of imparting desired structures to surfaces by laser structuring has, thus far, mainly been used in the automotive industry and for providing printing patterns on print rollers. An overview of this process is given in the dissertation "Oberflächenstrukturieren mit ultrakurzen Laserpulsen" by M. Weikert, University of Stuttgart, Herbert Utz Verlag GmbH, 2006, Germany.

SUMMARY OF THE INVENTION

One object of the invention is to provide a method of manufacturing a vibratable head for an aerosol generator which allows for the vibratable head to be fabricated in an efficient and precise manner. Further, the invention aims to provide a vibratable head manufactured by this method, an aerosol generator comprising this vibratable head, and a method of manufacturing such an aerosol generator. These goals are achieved by a method with the technical features of claim 1, a method with the technical features of claim 9, a vibratable head with the technical features of claim 10, and an aerosol generator with the technical features of claim 15. Preferred embodiments of the invention follow from the dependent claims.

The invention provides a method of manufacturing a vibratable or oscillatable head for an aerosol generator. The vibratable or oscillatable head comprises a support member, a membrane, i.e., a vibratable or oscillatable membrane, supported by the support member and a vibrator or oscillator configured to vibrate the membrane. The method comprises the steps of providing the support member, roughening or structuring a surface portion of the support member by laser structuring, applying an adhesive to at least a part of the roughened or structured surface portion of the support member and attaching, fixing, securing, mounting, joining and/or fastening at least one element or component to the support member by, via and/or through at least a portion of the adhesive.

The vibratable head is configured for generating an aerosol in an aerosol generator. The vibrator or oscillator is configured to vibrate or oscillate the vibratable or oscillatable membrane for generating an aerosol. The vibratable or oscillatable membrane is supported by the support member in a vibratable or oscillatable manner.

The vibrator or oscillator may be configured to vibrate or oscillate the vibratable or oscillatable membrane via and/or through the support member.

The vibratable or oscillatable membrane is configured to generate an aerosol, i.e., to aerosolise or nebulise a fluid or liquid supplied to the membrane. In particular, the vibratable or oscillatable membrane may have a plurality of holes or openings. Fluid or liquid abutting the membrane on one side thereof may be conveyed through these holes or openings in the vibrating or oscillating membrane to the other side thereof and emitted on this side as an aerosol.

The adhesive may be a glue, a resin, such as an epoxy resin, a rosin, a cement etc. or any combination thereof. The adhesive may be a curable adhesive, for example, an adhesive curable by the application of heat and/or radiation, such as UV radiation. Particularly preferred types of adhesive are epoxy-based adhesives.

The process of laser structuring comprises the application of a laser beam, in particular, a focused laser beam, on the surface portion of the support member to be roughened. The structure or morphology of the surface portion is altered by the application of the laser beam, e.g., due to laser ablation, for example, by the evaporation and/or sublimation of surface material, thereby creating a well-defined, precisely controlled roughening of the surface portion.

The process of laser structuring allows for a precise and well-defined roughening of the surface portion of the support member, providing a controlled and accurate delimitation between roughened and non-roughened, i.e., smooth, surface portions. By roughening the surface portion in this way, the wettability of the surface portion is increased as compared to a non-roughened surface, thus enabling a homogeneous distribution of the adhesive on the roughened surface portion. In contrast thereto, the portions of the surface of the support member which have not been roughened by laser structuring have a lower wettability, so that the border between the roughened surface portion and the remaining surface of the support member represents a barrier for the applied adhesive.

Hence, by accurately controlling the position and extension of the roughened surface portion using the above laser structuring process, also the distribution of the applied adhesive can be precisely controlled. In this way, the method of the present invention enables the attachment of one or more elements to the support member by at least a portion of the adhesive in an accurate and precise manner. Further, as opposed to, for example, the process of sandblasting, laser structuring is highly reproducible, so that any variations or fluctuations in the structure or morphology of the roughened surface portion, which may affect the vibrating characteristics or oscillatory behaviour of the vibratable head, can be reliably avoided.

Moreover, laser structuring is a quick and clean process that can be readily automated. No additional steps of cleaning and/or drying the support member after the surface roughening are necessary. Due to the absence of any abrasive wear in laser structuring equipment, maintenance work can be kept at a minimum. Therefore, the method of the present invention further enables the attachment of at least one element to the support member in an efficient, in particular, cost and time efficient, manner.

Thus, the method of the invention allows for the vibratable head to be fabricated in a precise and efficient manner.

The vibrator may be a piezoelectric element or comprise a piezoelectric element. The piezoelectric element may be configured to vibrate or oscillate the vibratable or oscillatable membrane.

The aerosol generator may be a nebuliser, such as a vibrating membrane nebuliser, e.g., an electronic vibrating membrane nebuliser, an atomiser or the like. In particular, the aerosol generator may be an electronic nebuliser, e.g., a piezoelectrically driven nebuliser, i.e., a nebuliser driven by a piezoelectric element. In this case, the piezoelectric element may form part of the vibrator and be arranged for vibrating or oscillating the vibratable or oscillatable membrane.

The at least one element which is attached, fixed, secured, mounted, joined and/or fastened to the support member of the vibratable head by at least a portion of the adhesive may be the vibrator and/or the vibratable membrane and/or one or more other elements, such as an information storage portion, e.g., a memory, or the like.

By attaching the vibrator and/or the vibratable membrane to the support member using the method of the invention, a well-defined, precise, robust and reliable connection between vibrator and/or vibratable membrane and support member can be achieved, improving the reliability and durability of the vibratable head and thus ensuring a high quality and dosage accuracy of the aerosol over an extended period of time. In particular, in this regard, a high degree of accuracy is desired for the relative arrangement of the vibrator and the support member and the relative arrangement of the vibratable membrane and the support member. Such a high degree of accuracy can be achieved by using the combined process of laser structuring and adhesive application according to the method of the present invention.

The adhesive may be applied to the entire roughened surface portion of the support member. In this way, corrosion or oxidation of a part of the roughened surface portion can be particularly reliably avoided.

The area of the roughened surface portion of the support member may be chosen so as to be substantially the same as that of an attachment surface portion of the at least one element over which the at least one element is attached to the support member by at least a portion of the adhesive. Alternatively, the area of the roughened surface portion may be smaller or larger than the attachment surface portion of the at least one element.

Choosing the area of the roughened surface portion so as to be larger than the attachment surface portion of the at least one element provides the benefit of manufacturing tolerances. In this case, a remainder of the roughened surface portion which is not in contact with the attachment surface portion of the support member via the adhesive may be also covered by the adhesive, so as to particularly reliably avoid corrosion or oxidation thereof.

A single element may be attached to the support member by at least a portion of the adhesive. Alternatively, a plurality of elements, e.g., two or more, three or more, four or more or five or more elements, may be attached to the support member by at least a portion of the adhesive.

A plurality of elements may be attached to one, e., single, roughened surface portion, in particular, one continuous surface portion.

A plurality of surface portions of the support member may be roughened by laser structuring. In this case, one or more elements may be attached to some or all of these roughened surface portions by at least a portion of an adhesive applied to at least a part of the roughened surface portions. Moreover, a single element may be attached to a plurality of roughened surface portions of the support member.

The surface portion of the support member may be roughened by laser structuring using a pulsed laser beam. The pulse length of the laser beam may be in the nanosecond or picosecond range. By using a pulsed laser beam, an excessive heat transfer to the support member can be particularly reliably avoided, thereby efficiently preventing a distortion, warping or bulging of the support member and minimising any strain or stress induced in the support member by the laser structuring. In this way, desired vibration characteristics of the vibratable head can be ensured in an especially reliable manner.

In the process of laser structuring the surface portion of the support member to be roughened, the support member and a laser beam may be moved relative to each other with a speed in the range from 500 mm/s to 10,000 mm/s. A particularly preferred speed of the relative movement of the support member and the laser beam is chosen.

It has been found that, by choosing a speed of relative movement as specified above, roughened surface portions of the support member can be obtained which enable a particularly durable attachment of the at least one element to the support member by the adhesive.

In the laser structuring process, the support member may be stationary and the laser beam may be moved relative to the support member, for example, with a speed as defined above. Alternatively, in the laser structuring process, the laser beam may be stationary and the support member may be moved relative to the laser beam, for example, with a speed as defined above. Further, in the laser structuring process, both the support member and the laser beam may be moved relative to each other, for example, with a speed of relative movement as defined above.

The average surface roughness $R_z$ of the roughened surface portion of the support member may be in the range from 3.0 to 25.0 μm, preferably in the range from 5.0 to 20.0 μm, more preferably in the range from 8.0 to 18.0 μm and even more preferably in the range from 10.0 to 15.0 μm. Such an average surface roughness of the roughened surface portion of the support member was found to provide a particularly high durability of the attachment of the at least one element to the support member by the adhesive.

The average surface roughness $R_z$ is defined as the average distance between the highest peak and the lowest valley in each of five sampling lengths. $R_z$ is given by the following equation:

$$R_z = \frac{1}{5}\sum_{i=1}^{5} R_{pi} + R_{vi}$$

wherein $R_{pi}$ and $R_{vi}$ are the height of the highest peak and the depth of the lowest valley, respectively, for the $i^{th}$ sampling length.

The surface roughness profile is measured by scanning electron microscopy (SEM) or by using a Perthometer with a diamond tip and an inductive transducer. The Perthometer is moved over the surface portion to be measured, allowing the diamond tip to follow the surface roughness, and the resulting vertical displacement of the diamond tip is converted into an electrical signal.

The roughness average $R_a$ of the roughened surface portion of the support member may be in the range from 0.2 to 5.0 μm, preferably in the range from 0.5 to 4.0 μm, more preferably in the range from 0.8 to 3.0 μm and even more preferably in the range from 1.0 to 2.0 μm. It has been found that, if such a roughness average of the roughened surface portion is chosen, a particularly durable and reliable attachment of the at least one element to the support member by the adhesive can be achieved.

The roughness average $R_a$ is defined as the arithmetic average of the absolute ordinate values of the surface roughness profile of a given surface.

The surface roughness profile can be measured by scanning electron microscopy (SEM) or by using a Perthometer with a diamond tip and an inductive transducer. The Perthometer can be, for example, the Mitutoyo Surftest SJ-400 apparatus.

A surface portion of the at least one element, e.g., vibrator and/or the vibratable membrane, in particular, an attachment surface portion over which the at least one element is attached to the roughened surface portion of the support member, may have an average surface roughness $R_z$ and/or a roughness average $R_a$ as defined above.

A surface portion of the vibrator may have attached thereto, e.g., by an adhesive, at least one element, such as a conductor, e.g., a flexible strip conductor, for example, a printed circuit board track or a strip line. Such conductors may be used for supplying power and/or signals, e.g., activation signals, to the vibrator.

The surface structure and/or morphology of the roughened surface portion of the support member may be controlled in the laser structuring process by adjusting, for example, the processing time and/or the processing speed, i.e., the speed of relative movement between support member and laser beam, and/or the processing density, e.g., the distance between neighbouring laser marks, and/or the laser power and/or the number of repetitions of the laser structuring process, i.e., the number of times the laser is scanned or moved over a given part of the surface portion of the support member to be roughened. The number of repetitions may be in a range from 1 to 30.

The support member may be tempered before and/or during and/or after the application of the adhesive to at least a part of the roughened surface portion of the support member.

The support member may be made of metal, such as steel, e.g., stainless steel, aluminium, iron etc. A particularly preferred material of the support member is stainless steel. By choosing a support member made of metal, a particularly robust and durable structure of the vibratable head can be achieved. Further, a surface portion of such a support member can be roughened in a particularly accurate and well-defined manner by laser structuring.

Alternatively, the support member may be made, for example, of a plastic or a ceramic. The vibratable membrane may be made, for example, of a metal, such as steel, e.g., stainless steel, aluminium, iron etc., or a plastic or a ceramic. A particularly preferred material for the membrane is stainless steel. A particularly preferred material for the vibrator is ceramic.

A surface portion of the vibratable membrane may be roughened by laser structuring. Such a roughening of a surface portion of the vibratable membrane allows for the particularly stable, reliable and durable application of an adhesive to the roughened surface portion. By applying an adhesive to the roughened surface portion of the vibratable membrane, a connection portion at which the vibratable membrane is connected, joined, attached, secured or fastened to the support member may be reliably sealed, thus particularly efficiently preventing corrosion or oxidation of the membrane and/or the support member at the connection portion.

Further, such a roughening of a surface portion of the vibratable membrane allows for the attachments of at least one element thereto.

The surface portion of the vibratable membrane roughened by laser structuring may be a peripheral or circumferential surface portion of the vibratable membrane, in particular, a surface portion, in which no openings or holes are provided. In this way, it can be ensured in a particularly reliable manner that the vibrating or oscillatory characteristics of the vibratable membrane are not affected by the laser structuring and/or adhesive application.

The vibratable membrane may be formed integrally with the support member. In this way, an especially robust and durable structure of the vibratable head can be achieved. Alternatively, the vibratable membrane may be attached to the support member, e.g., by attaching the vibratable membrane to the roughened surface portion of the support member by at least a portion of the adhesive, as has been detailed above.

Further, the invention provides a method of manufacturing an aerosol generator. The method comprises the steps of manufacturing a vibratable head using the method of the invention and at least partially accommodating the vibratable head in a housing.

The aerosol generator may be a nebuliser, such as a vibrating membrane nebuliser, e.g., an electronic vibrating membrane nebuliser, an atomiser or the like. In particular, the aerosol generator may be an electronic nebuliser, e.g., a piezoelectrically driven nebuliser, i.e., a nebuliser driven by a piezoelectric element. In this case, the piezoelectric element may form part of the vibrator and be arranged for vibrating or oscillating the vibratable or oscillatable membrane.

The housing may be made of a metal, a plastic, a ceramic etc. A particularly preferred material for the housing is plastic.

The housing may comprise a fluid or liquid reservoir for receiving a fluid or liquid to be aerosolised or nebulised by the vibratable head.

The fluid or liquid reservoir may be arranged for directly receiving the fluid or liquid to be aerosolised. For example, the fluid or liquid reservoir may be configured as or have a fluid or liquid chamber or container into which a fluid or liquid can be directly filled.

Further, the fluid or liquid reservoir may be arranged for receiving a fluid or liquid containing vessel. In particular, the fluid or liquid reservoir may be designed so that it does not directly receive the fluid or liquid but rather has an opening element, such as a thorn, a spike, a hollow needle or the like, arranged on its inside that opens the fluid containing vessel, e.g. a vial, a blister, an ampoule, a container, a canister, a reservoir, a cartridge, a pot, a tank, a pen, a storage, a syringe, or the like, inserted therein.

The fluid or liquid reservoir may be arranged in fluid communication with the vibratable head, e.g., the vibratable membrane.

A fluid or liquid to be nebulised or aerosolised by the aerosol generator may be a fluid or liquid for generation of a pharmaceutical aerosol for the delivery of an active compound.

An active compound is a natural, biotechnology-derived or synthetic compound or mixture of compounds useful for the diagnosis, prevention, management or treatment of a disease, condition or symptom of an animal, in particular, a human. Other terms which may be used as synonyms of active compounds include, for example, active ingredient, active pharmaceutical ingredient, drug substance, diagnostic material, drug, medicament and the like. The fluid could be of a liquid, solution, suspension, colloidal mixture or liposomal formulation form and can be prepared, mixed or opened before or during the application.

The active compound comprised in the fluid to be nebulised or aerosolised by the aerosol generator may be a drug substance or a medicament which is useful for the prevention, management, diagnosis or treatment of any disease, symptom or condition affecting the body cavities, the abdomen, the eyes, the intestine, the stomach, the nose, the sinuses, the osteomeatal complex, the mouth, the trachea, the lungs, the bronchi, the bronchioles, the alveoli and/or the respiratory tract.

Among the active compounds which may be useful for serving one of the purposes named previously and that may be used together with the present invention, are, for example, substances selected from the group consisting of anti-inflammatory compounds, anti-infective agents, antiseptics, prostaglandins, endothelin receptor agonists, phosphodiesterase inhibitors, beta-2-sympathicomimetics, decongestants, vasoconstrictors, anticholinergics, immunomodulators, mucolytics, anti-allergic drugs, antihistaminics, mast-cell stabilising agents, tumor growth inhibitory agents, wound healing agents, local anaesthetics, antioxidants, oligonucleotides, peptides, proteins, vaccines, vitamins, plant extracts, cholinesterase inhibitors, vasoactive intestinal peptide, serotonin receptor antagonists, and heparins, glucocorticoids, anti-allergic drugs, antioxidants, vitamins, leucotriene antagonists, anti-infective agents, antibiotics, antifungals, antivirals, mucolytics, decongestants, antiseptics, cytostatics, immunomodulators, vaccines, wound healing agents, local anaesthetics, oligonucleotides, xanthin derived agents, peptides, proteins and plant extracts. Such compound may be used in the form of a suspension, a solution, a colloidal formulation (i.e., liposomal), etc.

Examples of potentially useful anti-inflammatory compounds are glucocorticoids and non-steroidal anti-inflammatory agents such as betamethasone, beclomethasone, budesonide, ciclesonide, dexamethasone, desoxymethasone, fluoconolone acetonide, fluocinonide, flunisolide, fluticasone, icomethasone, rofleponide, triamcinolone acetonide, fluocortin butyl, hydrocortisone, hydroxycortisone-17-butyrate, prednicarbate, 6-methylprednisolone aceponate, mometasone furoate, dehydroepiandrosterone-sulfate (DHEAS), elastane, prostaglandin, leukotriene, bradykinin antagonists, non-steroidal anti-inflammatory drugs (NSAIDs), such as ibuprofen including any pharmaceutically acceptable salts, esters, isomers, stereoisomers, diastereomers, epimers, solvates or other hydrates, prodrugs, derivatives, or any other chemical or physical forms of active compounds comprising the respective active moieties.

Examples of anti-infective agents, whose class or therapeutic category is herein understood as comprising compounds which are effective against bacterial, fungal, and viral infections, i.e. encompassing the classes of antimicrobials, antibiotics, antifungals, antiseptics, and antivirals, are

- penicillins, including benzylpenicillins (penicillin-G-sodium, clemizone penicillin, benzathine penicillin G), phenoxypenicillins (penicillin V, propicillin), aminobenzylpenicillins (ampicillin, amoxycillin, bacampicillin), acylaminopenicillins (azlocillin, mezlocillin, piperacillin, apalcillin), carboxypenicillins (carbenicillin, ticarcillin, temocillin), isoxazolyl penicillins (oxacillin, cloxacillin, dicloxacillin, flucloxacillin), and amiidine penicillins (mecillinam);
- cephalosporins, including cefazolins (cefazolin, cefazedone); cefuroximes (cefuroxim, cefamandole, cefotiam), cefoxitins (cefoxitin, cefotetan, latamoxef, flomoxef), cefotaximes (cefotaxime, ceftriaxone, ceftizoxime, cefmenoxime), ceftazidimes (ceftazidime, cefpirome, cefepime), cefalexins (cefalexin, cefaclor, cefadroxil, cefradine, loracarbef, cefprozil), and cefiximes (cefixime, cefpodoxim proxetile, cefuroxime axetil, cefetamet pivoxil, cefotiam hexetil), loracarbef, cefepim, clavulanic acid / amoxicillin, Ceftobiprole;
- synergists, including beta-lactamase inhibitors, such as clavulanic acid, sulbactam, and tazobactam;
- carbapenems, including imipenem, cilastin, meropenem, doripenem, tebipenem, ertapenem, ritipenam, and biapenem;
- monobactams, including aztreonam;
- aminoglycosides, such as apramycin, gentamicin, amikacin, isepamicin, arbekacin, tobramycin, netilmicin, spectinomycin, streptomycin, capreomycin, neomycin, paromoycin, and kanamycin;

macrolides, including erythromycin, clarythromycin, roxithromycin, azithromycin, dithromycin, josamycin, spiramycin and telithromycin;

gyrase inhibitors or fluroquinolones, including ciprofloxacin, gatifloxacin, norfloxacin, ofloxacin, levofloxacin, perfloxacin, lomefloxacin, fleroxacin, garenoxacin, clinafloxacin, sitafloxacin, prulifloxacin, olamufloxacin, caderofloxacin, gemifloxacin, balofloxacin, trovafloxacin, and moxifloxacin;

tetracycline, including tetracyclin, oxytetracyclin, rolitetracyclin, minocyclin, doxycycline, tigecycline and aminocycline;

glycopeptides, including vancomycin, teicoplanin, ristocetin, avoparcin, oritavancin, ramoplanin, and peptide 4;

polypeptides, including plectasin, dalbavancin, daptomycin, oritavancin, ramoplanin, dalbavancin, telavancin, bacitracin, tyrothricin, neomycin, kanamycin, mupirocin, paromomycin, polymyxin B and colistin;

sulfonamides, including sulfadiazine, sulfamethoxazole, sulfalene, co-trimoxazole, co-trimetrol, co-trimoxazine, and co-tetraxazine;

azoles, including clotrimazole, oxiconazole, miconazole, ketoconazole, itraconazole, fluconazole, metronidazole, tinidazole, bifonazol, ravuconazol, posaconazol, voriconazole, and ornidazole and other antifungals including flucytosin, griseofulvin, tolnaftal, naftifin, terbinafin, amorolfin, ciclopiroxolamin, echinocandins, such as micafungin, caspofungin, anidulafungin;

nitrofurans, including nitrofurantoin and nitrofuranzone;

polyenes, including amphotericin B, natamycin, nystatin, flucytosine;

other antibiotics, including tithromycin, lincomycin, clindamycin, oxazolindiones (linzezolids), ranbezolid, streptogramine A+B, pristinamycin A+B, Virginiamycin A+B, dalfopristin /quinupristin (Synercid), chloramphenicol, ethambutol, pyrazinamid, terizidon, dapson, prothionamid, fosfomycin, fucidinic acid, rifampicin, isoniazid, cycloserine, terizidone, ansamycin, lysostaphin, iclaprim, mirocin B17, clerocidin, filgrastim, and pentamidine;

antivirals, including aciclovir, ganciclovir, birivudin, valaciclovir, zidovudine, didanosin, thiacytidin, stavudin, lamivudin, zalcitabin, ribavirin, nevirapirin, delaviridin, trifluridin, ritonavir, saquinavir, indinavir, foscarnet, amantadin, podophyllotoxin, vidarabine, tromantadine, and proteinase inhibitors, siRNA based drugs;

antiseptics, including acridine derivatives, iodine-povidone, benzoates, rivanol, chlorhexidine, quarternary ammonium compounds, cetrimides, biphenylol, clorofene, and octenidine;

plant extracts or ingredients, such as plant extracts from chamomile, hamamelis, echinacea, calendula, thymian, papain, pelargonium, pine trees, essential oils, myrtol, pinen, limonen, cineole, thymol, mental, camphor, tannin, alpha-hederin, bisabolol, lycopodia, vitapherole;

wound healing compounds including dexpantenol, allantoin, vitamins, hyaluronic acid, alpha-antitrypsin, anorganic and organic zinc salts/compounds, salts of bismuth and selen;

interferones (alpha, beta, gamma), tumor necrosis factors, cytokines, interleukines;

immunmodulators including methotrexat, azathioprine, cyclosporine, tacrolimus, sirolimus, rapamycin, mofetil; mofetil-mycophenolate.

cytostatics and metastasis inhibitors;

alkylants, such as nimustine, melphanlane, carmustine, lomustine, cyclophosphamide, ifosfamide, trofosfamide, chlorambucil, busulfane, treosulfane, prednimustine, thiotepa;

antimetabolites, e.g. cytarabine, fluorouracil, methotrexate, mercaptopurine, tioguanine;

alkaloids, such as vinblastine, vincris ne, vindesine;

antibiotics, such as alcarubicine, bleomycin, dactinomycine, daunorubicine, doxorubicine, epirubicin, idarubicine, mitomycine, plicamycine;

complexes of transition group elements (e.g. Ti, Zr, V, Nb, Ta, Mo, W, Pt) such as carboplatinum, cis-platinum and metallocene compounds such as titanocendichloride;

amsacrine, dacarbazine, estramustine, etoposide, beraprost, hydroxycarbamide, mitoxanthrone, procarbazine, temiposide;

paclitaxel, gefitinib, vandetanib, erlotinib, poly-ADP-ribose-polymerase (PRAP) enzyme inhibitors, banoxantrone, gemcitabine, pemetrexed, bevacizumab, ranibizumab.

Examples of potentially useful mucolytics are DNase, P2Y2-agonists (denufosol), drugs affecting chloride and sodium permeation, such as N-(3,5-Diamino-6-chloropyrazine-2-carbony)-N'-{4-[4-(2,3-dihydroxypropoxy)-phenyl] butyl}guanidine methanesulfonate (PARION 552-02), heparinoids, guaifenesin, acetylcysteine, carbocysteine, ambroxol, bromhexine, tyloxapol, lecithins, myrtol, and recombinant surfactant proteins.

Examples of potentially useful vasoconstrictors and decongestants which may be useful to reduce the swelling of the mucosa are phenylephrine, naphazoline, tramazoline, tetryzoline, oxymetazoline, fenoxazoline, xylometazoline, epinephrine, isoprenaline, hexoprenaline, and ephedrine.

Examples of potentially useful local anaesthetic agents include benzocaine, tetracaine, procaine, lidocaine and bupivacaine.

Examples of potentially useful antiallergic agents include the afore-mentioned glucocorticoids, cromolyn sodium, nedocromil, cetrizin, loratidin, montelukast, roflumilast, ziluton, omalizumab, heparinoids and other antihistamins, including azelastine, cetirizin, desloratadin, ebastin, fexofenadin, levocetirizin, loratadin.

Examples of potentially useful anticholinergic agents include ipratropium bromide, tiotropium bromide, oxitropium bromide, glycopyrrolate.

Examples of potentially useful beta-2-sympathicomimetic agents include salbutamol, fenoterol, formoterol, indacaterol, isoproterenol, metaproterenol, salmeterol, terbutaline, clenbuterol, isoetarine, pirbuterol, procaterol, ritodrine.

Examples of xanthine derived agents include theophylline, theobromine, caffeine.

Antisense oligonucleotides are short synthetic strands of DNA (or analogs) that are complimentary or antisense to a target sequence (DNA, RNA) designed to halt a biological event, such as transcription, translation or splicing. The resulting inhibition of gene expression makes oligonucleotides dependent on their composition useful for the treatment of many diseases and various compounds are currently clinically evaluated, such as ALN-RSV01 to treat the respiratory syncytical virus by, AVE-7279 to treat asthma and allergies, TPI-ASM8 to treat allergic asthma, 1018-ISS to treat cancer. Examples of potentially useful peptides and proteins include antibodies against toxins produced by microorganisms, antimicrobial peptides such as cecropins, defensins, thionins, and cathelicidins.

The method of manufacturing an aerosol generator according to the present invention comprises the step of manufacturing a vibratable head using the method of the invention. Hence, the further features disclosed in connection with the above description of the method of the invention of manufacturing a vibratable head may also be applied to the method of manufacturing an aerosol generator.

The invention further provides a vibratable head for an aerosol generator. The vibratable head comprises a support member, a vibratable or oscillatable membrane supported by the support member and a vibrator or oscillator configured to vibrate or oscillate the vibratable membrane. A surface portion of the support member is roughened or structured by laser structuring. An adhesive is applied to at least a part of the roughened or structured surface portion of the support member and at least one element is attached, fixed, secured, mounted, fastened or joined to the support member by, via or through at least a portion of the adhesive.

The process of laser structuring leaves clearly visible traces in the roughened surface portion of the support member, such as an ordered surface roughness, which allow for a surface portion roughened by laser structuring to be distinguished from a surface portion roughened by different processes, such as sand or bead blasting. The roughened surface portion of the support member thus has an ordered, e.g., regular, periodic and/or homogeneous, surface roughness.

The at least one element attached to the support member by at least a portion of the adhesive may be the vibrator and/or the vibratable membrane.

The adhesive may be applied to the entire roughened surface portion of the support member.

A surface portion of the vibratable membrane may be roughened by laser structuring.

The vibratable membrane may be formed integrally with the support member.

The vibratable head may comprise one or more electrical contacts, e.g., plugs, connectors, jacks, clips, cinches, or the like, for connection to a control, e.g., an external control.

The control may be any type of control, e.g., a control unit, a control element, a control circuit or the like. The control may be capable of operating the vibrator of the vibratable head. The control may be connectable through the one or more electrical contacts to the vibrator, e.g., to a power supply element of the vibrator.

The vibratable head of the invention is a vibratable head manufactured by the manufacturing method according to the invention. Therefore, the further features disclosed in connection with the above description of the method of the invention of manufacturing a vibratable head may also be applied to the vibratable head of the invention.

Moreover, the invention provides an aerosol generator comprising the vibratable head according to the invention and a housing. The vibratable head is at least partially accommodated in the housing.

The aerosol generator of the invention is an aerosol generator manufactured by the manufacturing method according to the invention. Hence, the further features disclosed in connection with the above description of the method of manufacturing an aerosol generator according to the invention may also be applied to the aerosol generator of the invention.

BRIEF DESCRIPTION OF THE DRAWINGS

Hereinafter, non-limiting examples of the invention are explained with reference to the drawings, in which:

FIG. 2 shows schematic views of a part of a vibratable head according to an embodiment of the present invention, wherein FIG. 2(a) shows a schematic plan view of the part of the vibratable head and FIG. 2(b) shows a schematic cross-sectional view of the part of the vibratable head;

FIG. 3 shows schematic views of a part of a vibratable head according to an embodiment of the present invention, wherein FIG. 3(a) shows a schematic plan view of the part of the vibratable head and FIG. 3(b) shows a schematic cross-sectional view of the part of the vibratable head;

FIG. 4 shows schematic views of a part of a vibratable head according to an embodiment of the present invention, wherein FIG. 4(a) shows a schematic plan view of the part of the vibratable head and FIG. 4(b) shows a schematic cross-sectional view of the part of the vibratable head;

FIG. 5 shows schematic views of a part of a vibratable head according to an embodiment of the present invention, wherein FIG. 5(a) shows a schematic plan view of the part of the vibratable head and FIG. 5(b) shows a schematic cross-sectional view of the part of the vibratable head;

FIG. 6 shows schematic views of a part of a vibratable head according to an embodiment of the present invention, wherein FIG. 6(a) shows a schematic plan view of the part of the vibratable head and FIG. 6(b) shows a schematic cross-sectional view of the part of the vibratable head;

FIG. 7 shows schematic views of a part of a vibratable head according to an embodiment of the present invention, wherein FIG. 7(a) shows a schematic plan view of the part of the vibratable head and FIG. 7(b) shows a schematic cross-sectional view of the part of the vibratable head;

FIG. 8 shows schematic views of a part of a vibratable head according to an embodiment of the present invention, wherein FIG. 8(a) shows a schematic plan view of the part of the vibratable head and FIG. 8(b) shows a schematic cross-sectional view of the part of the vibratable head;

FIG. 9 shows schematic views of a part of a vibratable head according to an embodiment of the present invention, wherein FIG. 9(a) shows a schematic plan view of the part of the vibratable head and FIG. 9(b) shows a schematic cross-sectional view of the part of the vibratable head;

DETAILED DESCRIPTION OF CURRENTLY PREFERRED EMBODIMENTS

Figure 1:
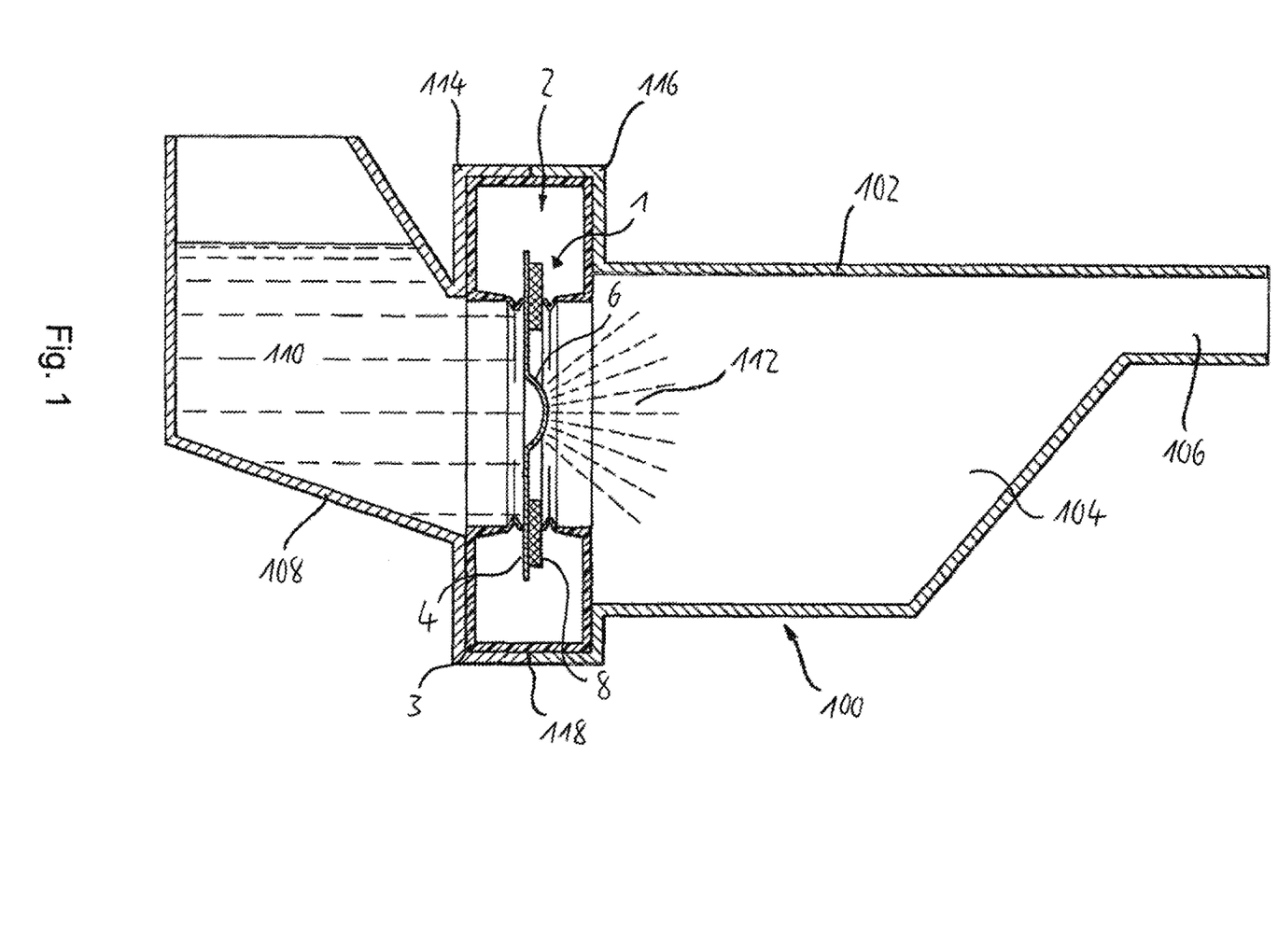
FIG. 1 shows a schematic longitudinally cut cross-sectional view of an aerosol delivery device comprising an aerosol generator according to an embodiment of the present invention.

FIG. 1 shows a schematic longitudinally cut cross-sectional view of an aerosol delivery device 100 comprising an aerosol generator 2 according to a currently preferred embodiment of the present invention.

The aerosol delivery device 100 comprises a first housing part 102 and a second housing part 108 which are joined to each other at a connection portion 118. The first housing part 102 has an aerosol chamber 104 and a mouthpiece 106. The second housing portion 108 forms a fluid chamber for receiving a fluid 110 to be aerosolised.

An aerosol generator 2 is received in recesses 114, 116 formed in the second housing part 108 and the first housing part 102, respectively. The aerosol generator 2 comprises an annular housing 3 and a vibratable head 1 which is partially accommodated in the housing 3. The vibratable head 1 comprises an annular support member 4 and a circular vibratable membrane 6 supported by the support member 4. The vibratable membrane 6 is integrally formed with the support member 4. The vibratable membrane 6 and the support member 4 are made from a metal, such as stainless steel. The vibratable membrane 6 has a plurality of holes or openings (not shown).

The vibratable head 1 further comprises a vibrator 8 which is configured to vibrate the vibratable membrane 6. The vibrator 8 is attached by an adhesive to a surface portion of the support member 4 which has been roughened by laser structuring. The details of the attachment of the vibrator 8 to the support member 4 will be described in more detail below with reference to FIG. 2. The vibrator 8 is an annular piezoelectric element made of ceramic.

In the following, operation of the aerosol delivery device 100 for the generation and delivery of an aerosol will be described.

A fluid 110 to be aerosolised, for example, a fluid comprising an active compound, such as a drug substance or a medicament, is filled into the fluid reservoir formed by the second housing part 108.

The fluid 110 received in the fluid reservoir abuts the vibratable membrane 6 of the vibratable head 1.

A control (not shown) is operated to supply an activation signal to the vibrator 8 via electrical contacts (not shown) of the vibrator 8, activating the vibrator 8 and thus causing the vibratable membrane 6 to vibrate. The electrical contacts of the vibrator 8 may be provided in the form of one or more conductors, e.g., one or more flexible strip conductors, for example, printed circuit board tracks or strip lines. The one or more conductors may be attached to one or more surface portions of the vibrator 8, e.g., by an adhesive.

The fluid 110 abutting the membrane 6 is conveyed through the holes or openings (not shown) in the vibrating membrane 6 and thereby aerosolised into the aerosol chamber 104. The aerosol 112 thus provided in the aerosol chamber 104 is inhaled by a patient or user through the mouthpiece 106, which is arranged in fluid communication with the aerosol chamber 104.

Figure 2:
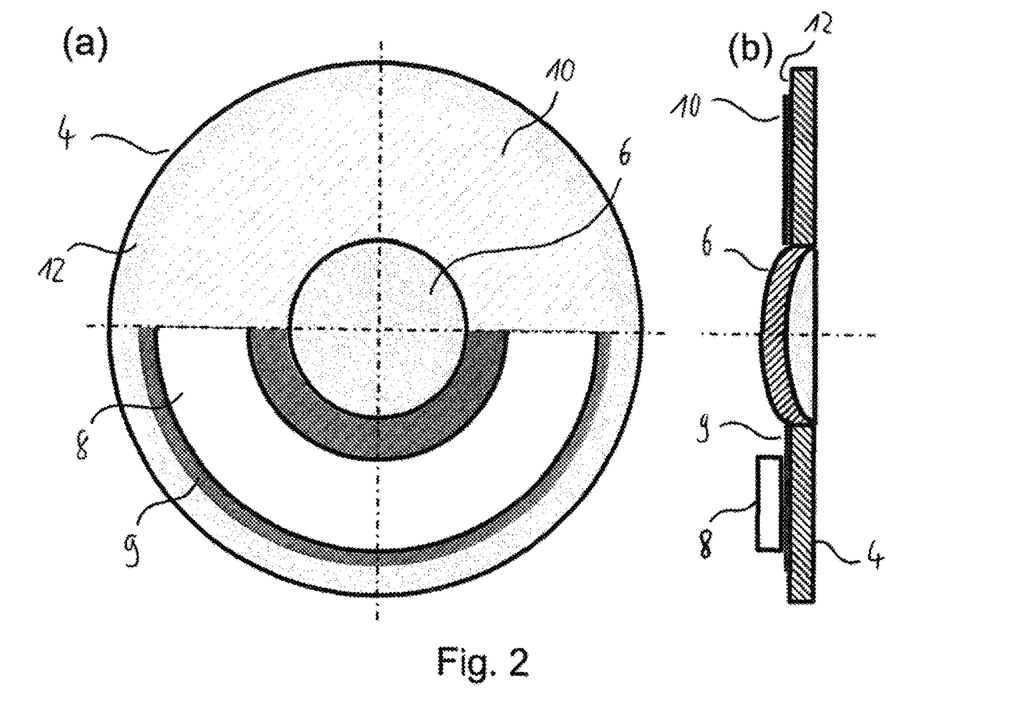

FIG. 2 shows schematic views of a part of the vibratable head 1 of the aerosol generator 2 of the aerosol delivery device 100 shown in FIG. 1. FIG. 2(a) shows a plan view of the part of the vibratable head 1. FIG. 2(b) shows a schematic cross-sectional view of the part of the vibratable head 1. In the upper parts of FIGS. 2(a) and (b), the vibrator 8 and the adhesive 9 have been omitted and, in the lower part of FIG. 2(b), a roughened surface portion 10 has been omitted for better presentability. The same form of presentation has also been used in FIGS. 3 to 9.

As is indicated by a hatched area in the upper part of FIG. 2(a) and by a solid line in the upper part of FIG. 2(b), the support member 4 of the vibratable head 1 comprises an annular surface portion 10 which has been roughened by laser structuring. In the radially inward direction of the support member 4, the roughened surface portion 10 extends to the peripheral edge of the vibratable membrane 6. In the radially outward direction of the support member 4, the roughened surface portion 10 stops before the peripheral edge of the support member 4, leaving an annular non-roughened surface portion 12 at the circumference of the support member 4.

The adhesive 9 is applied to the entire roughened surface portion 10 of the support member 4 (see the lower part of FIG. 2(a)), thus reliably preventing corrosion or oxidation of this surface portion 10. As is schematically shown in FIGS. 2(a) and (b), an area of an attachment surface of the vibrator 8, over which the vibrator 8 is attached to the roughened surface portion 10 by a portion of the adhesive 9, is smaller than the area of the roughened surface portion 10, thus providing the benefit of manufacturing tolerances.

Figure 3:
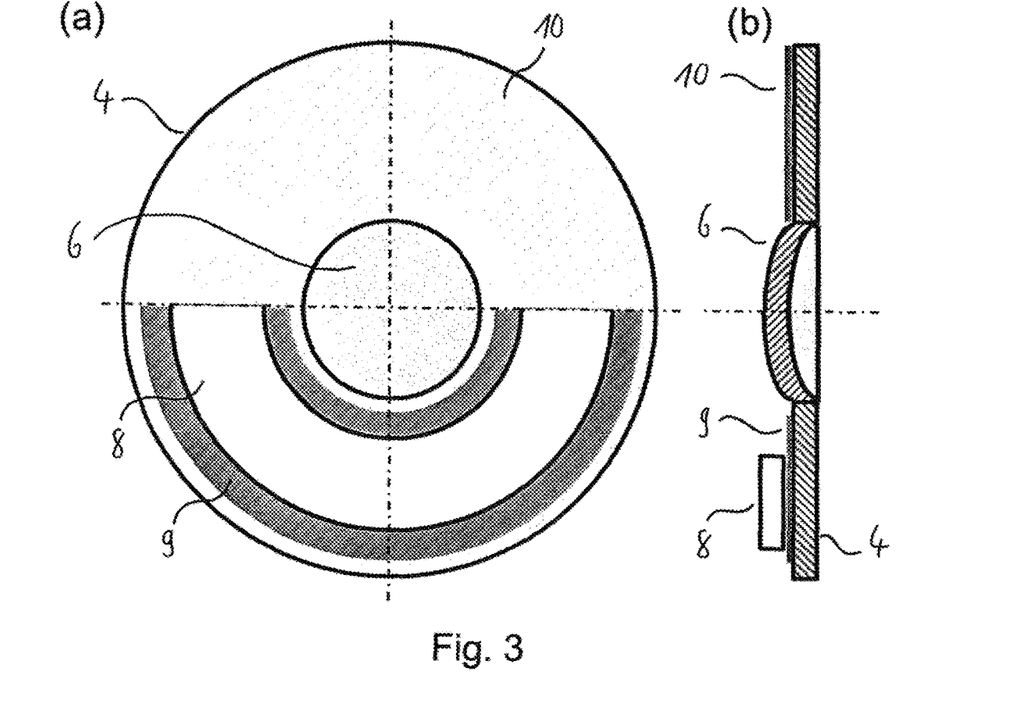

FIG. 3 shows schematic views of a part of a vibratable head according to another embodiment of the present invention. In FIG. 3, like elements are designated with like reference signs as in FIG. 2.

The vibratable head according to the embodiment shown in FIG. 3 differs from the vibratable head 1 according to the embodiment shown in FIG. 2 in that the roughened surface portion 10 of the support member 4 extends in the radially outward direction of the support member 4 to the peripheral edge of the support member 4, as is schematically shown in FIG. 3(a) and the upper part of FIG. 3(b).

Figure 4:
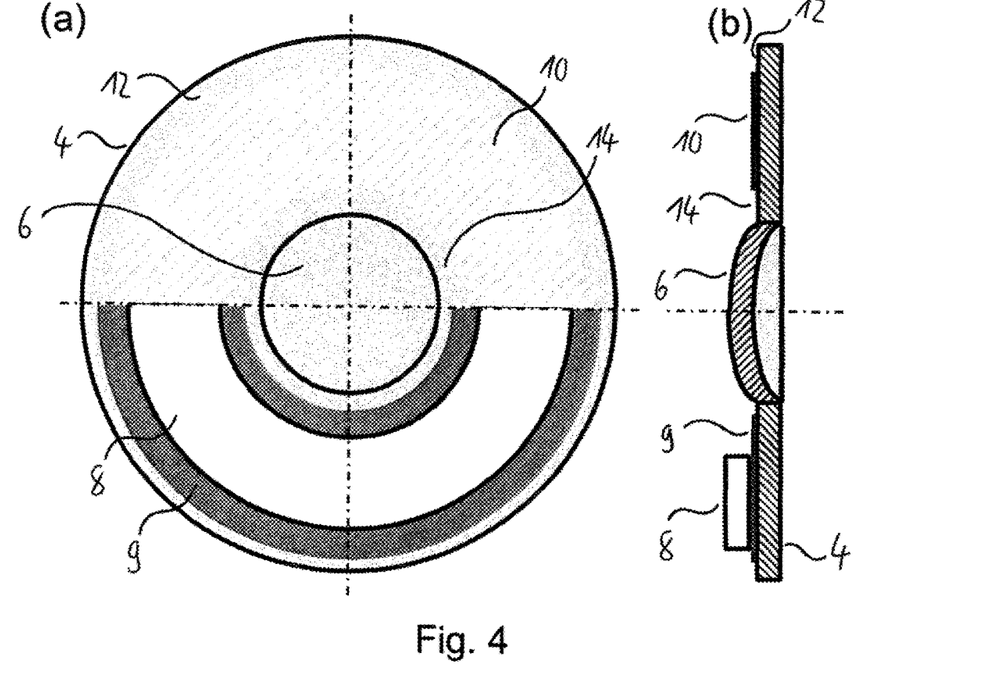

FIG. 4 shows schematic views of a part of a vibratable head according to another embodiment of the present invention. In FIG. 4, like elements are designated with like reference signs as in FIGS. 2 and 3.

The vibratable head according to the embodiment shown in FIG. 4 differs from the vibratable head 1 according to the embodiment shown in FIG. 2 in that, in the radially inward direction of the support member 4, the roughened surface portion 10 does not extend to the peripheral edge of the membrane 6, leaving an annular non-roughened surface portion 14 around the circumference of the membrane 6. In this way, it can be ensured in a particularly reliable manner that the roughening of the surface portion 10 does not affect the oscillatory behaviour or vibrating characteristics of the membrane 6. As is schematically shown in the lower parts of FIGS. 4(a) and (b), the adhesive 9 is applied over a surface area of the support member 4 which extends beyond the roughened surface portion 10 in the radially outward and radially inward directions of the support member 4.

Figure 5:
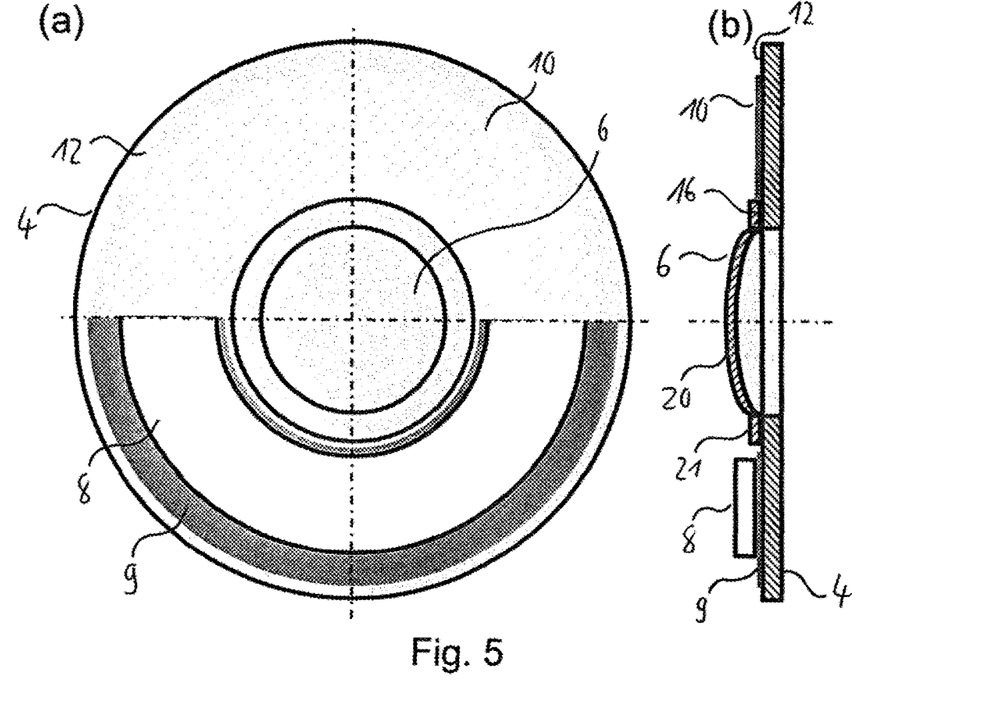

FIG. 5 shows schematic views of a part of a vibratable head according to another embodiment of the present invention. In FIG. 5, like elements are designated with like reference signs as in FIGS. 2 to 4.

The vibratable head according to the embodiment shown in FIG. 5 differs from the vibratable head 1 according to the embodiment shown in FIG. 2 in that the vibratable membrane 6 is not formed integrally with the support member 4 but attached thereto at an annular connection portion 16. The vibratable membrane 6 may be attached to the support member 4 at the connection portion 16, for example, by welding, soldering or the like.

Alternatively, the surface portion of the support member 4 at which the membrane 6 is attached thereto may be partially or entirely roughened by laser structuring and the membrane 6 may be attached to the support member 4 at the connection portion 16 by an adhesive, substantially in the same way as the vibrator 8 is attached to the roughened surface portion 10 of the support member 4.

The membrane 6 has a convex portion 20 and an annular, flat peripheral portion 21 integrally formed with and surrounding the convex portion 20. The peripheral portion 21 of the membrane 6 is attached to the support member 4 at the connection portion 16.

As is schematically shown in FIG. 5(a) and the upper part of FIG. 5(b), the roughened surface portion 10 extends to the peripheral edge of the peripheral portion 21 of the membrane 6 in the radially inward direction of the support member 4, but stops before the peripheral edge of the support member 4 in the radially outward direction of the support member 4, leaving the annular non-roughened surface portion 12 at the circumference of the support member 4.

As is schematically shown in the lower parts of FIGS. 5(a) and (b), the adhesive 9 is applied over a surface area of the support member 4 which extends beyond the roughened surface portion 10 in the radially outward direction of the support member 4 but stops before the peripheral edge of the peripheral portion 21 of the membrane 6 in the radially inward direction of the support member 4.

Figure 6:
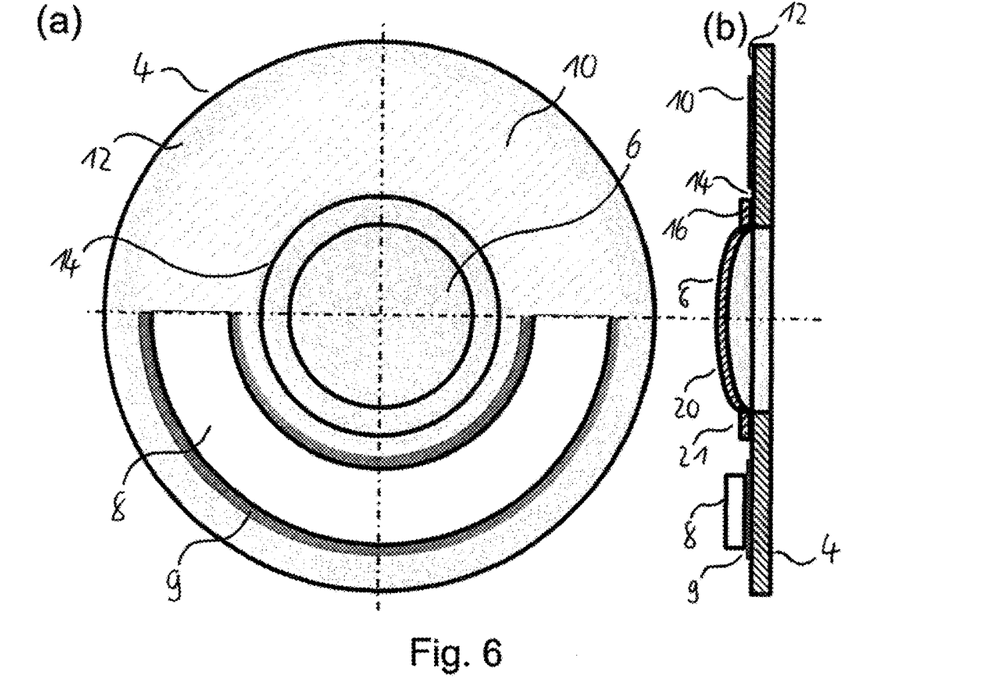

FIG. 6 shows schematic views of a part of a vibratable head according to another embodiment of the present invention. In FIG. 6, like elements are designated with like numerals as in FIGS. 2 to 5.

The vibratable head according to the embodiment shown in FIG. 6 differs from the vibratable head according to the embodiment shown in FIG. 5 in that the roughened surface portion 10 of the support member 4 does not extend to the peripheral edge of the peripheral portion 21 of the vibratable membrane 6 in the radially inward direction of the support member 4, leaving the annular non-roughened surface portion 14 along the outer circumference of the membrane 6.

In this way, it can be ensured in a particularly reliable manner that the oscillatory behaviour or vibration characteristics of the vibratable membrane 6 are not affected by the roughening of the surface portion 10.

As is schematically shown in the lower parts of FIGS. 6(a) and (b), the adhesive 9 is applied over a surface area of the support member 4 which stops before the outer peripheral edge of the roughened surface portion 10 in the radially outward direction of the support member 4 and the inner peripheral edge of the roughened surface portion 10 in the radially inward direction of the support member 4.

Figure 7:
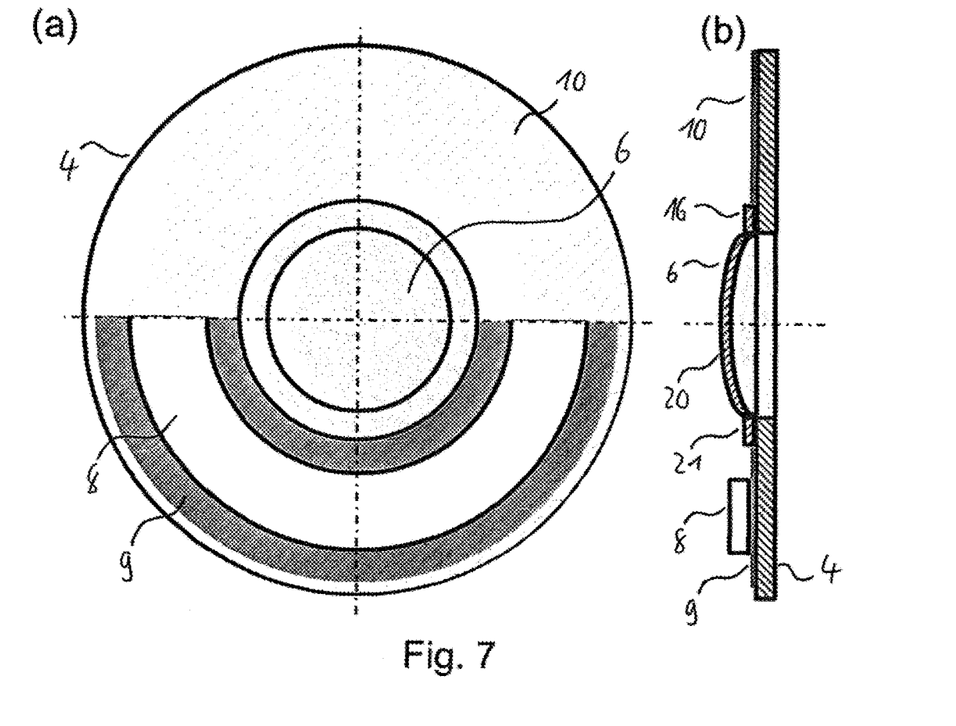

FIG. 7 shows schematic views of a part of a vibratable head according to another embodiment of the present invention. In FIG. 7, like elements are designated with like numerals as in FIGS. 2 to 6.

The vibratable head according to the embodiment shown in FIG. 7 differs from the vibratable head according to the embodiment shown in FIG. 5 in that the roughened surface portion 10 of the support member 4 extends to the peripheral edge of the support member 4 in the radially outward direction of the support member 4.

As is schematically shown in the lower parts of FIGS. 7(a) and (b), the adhesive 9 is applied over a surface area of the support member 4 which extends to the peripheral edge of the peripheral portion 21 of the membrane 6 in the radially inward direction of the support member 4 but stops before the peripheral edge of the support member 4 in the radially outward direction of the support member 4.

Figure 8:
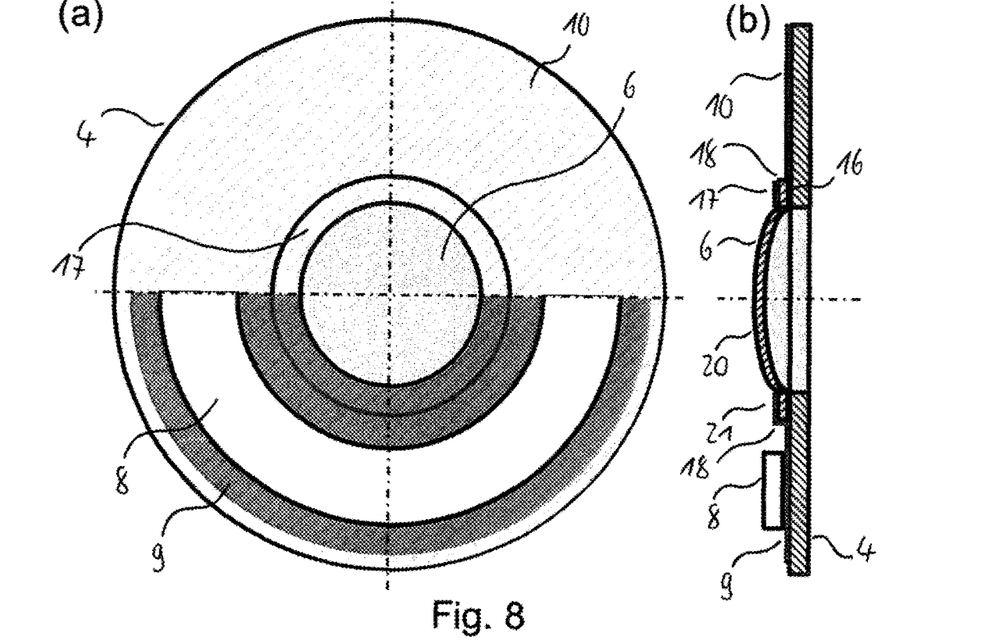

FIG. 8 shows schematic views of a part of a vibratable head according to another embodiment of the present invention. In FIG. 8, like elements are designated with like reference signs as in FIGS. 2 to 7.

The vibratable head according to the embodiment shown in FIG. 8 differs from the vibratable head according to the embodiment shown in FIG. 7 in that a peripheral surface portion 17 of the vibratable membrane 6, i.e., of the peripheral portion 21 thereof, is roughened by laser structuring.

The roughened surface portion 17 extends in the radially inward direction of the membrane 6 to the peripheral edge of the convex portion 20 of the membrane 6 and in the radially outward direction of the membrane 6 to the peripheral edge of the peripheral portion 21 of the membrane 6.

The adhesive 9 is applied to the roughened surface portion 17 of the vibratable membrane 6. The adhesive is applied to the roughened surface portions 10, 17 so as to extend over a step 18 formed between the membrane 6 and the support member 4, as is schematically shown in the lower part of FIG. 8(b). In the radially outward direction of the support member 4, the surface area of the support member 4 over which the adhesive 9 is applied stops before the peripheral edge of the support member 4.

By applying the adhesive to the roughened surface portion 10 of the support member 4 and the roughened surface portion 17 of the vibratable membrane 6 in this way, the step 18 formed between membrane 6 and support member 4 is reliably sealed, thus particularly efficiently preventing corrosion or oxidation of the membrane 6 and/or the support member 4 at the connection portion 16.

Figure 9:
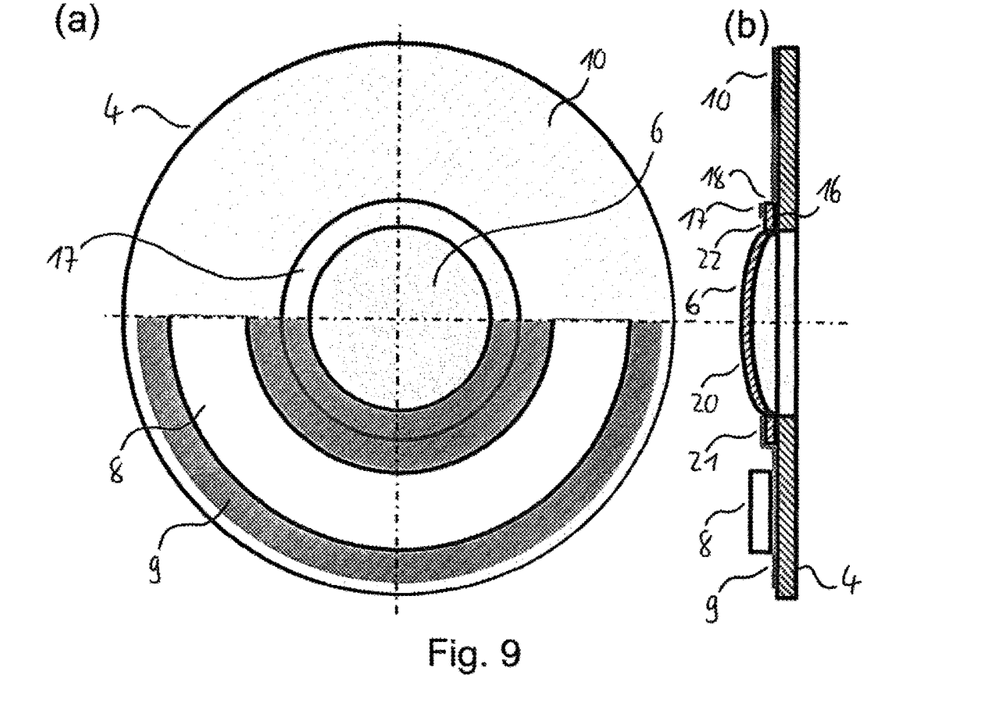

FIG. 9 shows schematic views of a part of a vibratable head according to another embodiment of the present invention. In FIG. 9, like elements are designated with like reference signs as in FIGS. 2 to 8.

The vibratable head according to the embodiment shown in FIG. 9 differs from the vibratable head according to the embodiment shown in FIG. 8 in that the roughened surface portion 17 of the vibratable membrane 6 does not extend to the peripheral edge of the convex portion 20 of the membrane 6 in the radially inward direction of the membrane 6, leaving an annular non-roughened surface portion 22 along the circumference of the convex portion 20.

The adhesive 9 is applied to the roughened surface portions 10, 17, thereby sealing the step 18 between the vibratable membrane 6 and the support member 4. By leaving the annular non-roughened surface portion 22 at the circumference of the convex portion 20, it can be particularly reliably ensured that the oscillatory behaviour or the vibrating characteristics of the vibratable membrane 6 are not affected by the roughening of the surface portion 17.

As is schematically shown in the lower parts of FIGS. 9(a) and (b), the adhesive 9 is applied over a surface area of the support member 4 which extends to the peripheral edge of the convex portion 20 of the membrane 6 in the radially inward direction of the support member 4 but stops before the peripheral edge of the support member 4 in the radially outward direction of the support member 4.

In the following, measurements performed on surface portions of different support members which had been roughened using different laser structuring processes will be discussed. In particular, in these laser structuring processes, the processing speed, i.e., the speed with which the support member and the laser beam were moved relative to each other, was varied, resulting in variations of the roughness of the roughened surface portion. Moreover, for the surface portions which had been roughened at the same processing speed, variations in the average surface roughness $R_z$ and the roughness average $R_a$ were achieved by varying further process parameters, namely the laser power, the laser focus position, the laser pulse frequency and the number of laser passes. The surface profiles of the roughened surface portions were measured using a Perthometer with a diamond tip and an inductive transducer. The Perthometer was moved over the surface portion to be measured, allowing the diamond tip to follow the surface roughness, and the resulting vertical displacement of the diamond tip was converted into an electrical signal.

The average surface roughnesses $R_z$ and roughness averages $R_a$ in µm and the processing speed modes for the different roughened surface portions are given in Table 1 below. The processing speeds of modes 1 to 3 are in the range from 500 mm/s to 10,000 mm/s. The processing speed of mode 1 is higher than the processing speed of mode 2 and the processing speed of mode 2 is higher than the processing speed of mode 3.

TABLE 1

| Processing Speed [mode number] | Average Surface Roughness $R_Z$ [μm] | Roughness Average $R_a$ [μm] |
|---|---|---|
| 1 | 9.51 | 1.85 |
| 1 | 8.78 | 1.77 |
| 1 | 9.54 | 1.52 |
| 2 | 10.14 | 2.07 |
| 2 | 19.71 | 2.50 |
| 2 | 11.56 | 2.07 |
| 3 | 13.35 | 2.05 |
| 3 | 11.98 | 2.26 |
| 3 | 9.77 | 2.12 |

Adhesive was applied to the above roughened surface portions and the durability of the joint formed between the adhesive and the roughened surface portion was determined.

The solidity and durability of the adhesive on the laser structured substrate was tested by simulating a stress test. The stress test indicates the maximal reliability of the adhesive bonding.

A simulated use test was performed, in which the use of the vibratable head by a patient was simulated under substantially realistic conditions. The test was carried out by performing a repeated sequence of nebulisation, cleaning and thermal disinfection in the same manner as in normal operation. The stress test also included using an autoclave for thermal disinfection/sterilisation up to 50 cycles. For example, an autoclave of the company Systec can be used for this purpose, e.g., Autoklav 3850 EL.

As a further test, a frequency band analysis was performed to analyse the vibratable head of the aerosol generator. Especially, an impedance measurement of the vibratable head was performed. The analysis or measurement of the vibrational spectrum may show a shift in resonance pattern of the vibratable head that can indicate invisible changes of the quality of the adhesive bonding. In the normal case, the resonance frequency of the vibratable head is within the specified range.

An additional test regarding the aerosol performance of the vibratable head, such as aerosol output rate, particle size distribution (MMD, GSD), was performed to ensure the correct and specified performance characteristics of the vibratable head in the aerosol generator.

It was found that a particularly high durability of the adhesive joint was achieved for roughened surface portions having an average surface roughness $R_z$ in the range from 5.0 to 18.0 μm and a roughness average $R_a$ in the range from 0.5 to 3.0 μm. Particularly durable adhesive joints were obtained by laser structuring with an adequate processing speed, for example mode number 3 (Table 1).

Figure 10:
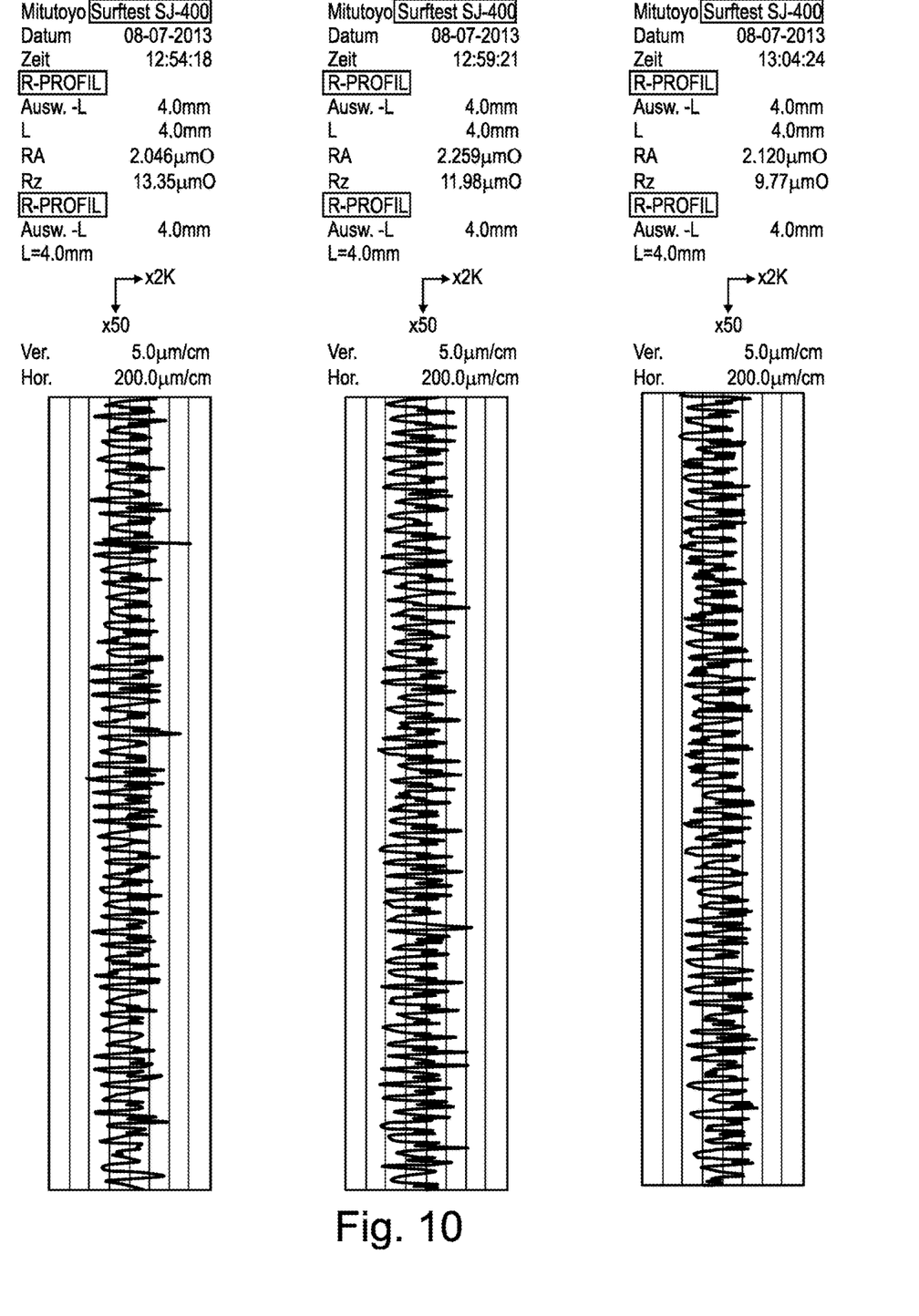
FIG. 10 shows measured surface profiles of three different roughened surface portions of support members of vibratable heads according to embodiments of the present invention.

Measurement profiles for the roughened surface portions shown in Table 1 above which were provided with laser structuring at an adequate processing speed are shown in FIG. 10. As has been detailed above, these profiles were measured using a Perthometer with a diamond tip and an inductive transducer.

As can be seen from the surface profiles shown in FIG. 10, roughened surfaces with an ordered roughness can be created by laser structuring.

Figure 11:
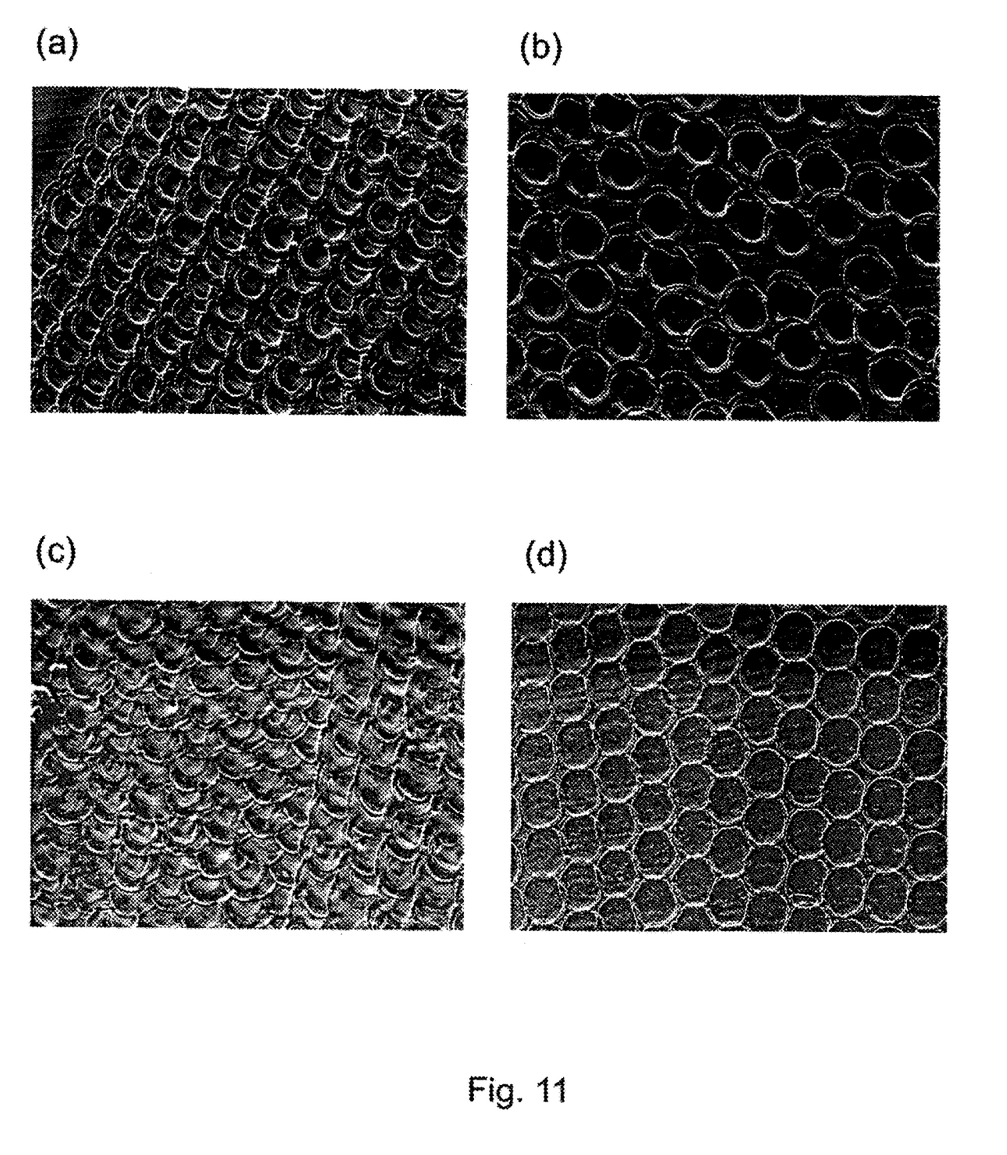
FIG. 11 shows SEM images of four different roughened surface portions of support members of vibratable heads according to embodiments of the present invention.

FIG. 11 shows SEM images of four different roughened surface portions of support members of vibratable heads according to embodiments of the present invention. The surface portions shown in FIG. 11 were roughened by laser structuring with an adequate processing speed, an adequate laser power and an adequate laser pulse frequency. For the surface portions shown in FIGS. 11(a), (c) and (d), the laser was applied in a first pattern, while for the surface portion shown in FIG. 11(b), the laser was applied in a second pattern. The laser structuring processes employed for roughening the surface portions shown in FIGS. 11(a), (c) and (d) differ in the number of laser pulses, which is medium for FIG. 11(a), high for FIG. 11(c) and low for FIG. 11(d). The number of laser pulses for the surface portion shown in FIG. 11(b) is medium. As is evident from FIG. 11, varying the number of laser pulses and/or the laser structuring pattern allows for the resulting surface profile to be varied in a controlled manner.

Alternatively or additionally, the processing speed and/or the laser power and/or the laser pulse frequency may be varied to create different laser structuring patterns.

The foregoing embodiments and their variants have been disclosed for illustrative purposes only, and further variation is wholly possible within the capabilities of the skilled reader. Accordingly, the appended claims are intended to cover all modifications, substitutions, alterations, omissions and additions which one skilled in the art could achieve from the foregoing disclosure, taking into account his own general and specialist knowledge and expertise.

The invention claimed is:

1. A method of manufacturing a vibratable head for an aerosol generator, the vibratable head comprising
   a support member,
   a vibratable membrane supported by the support member, and
   a vibrator configured to vibrate the vibratable membrane,
   the method comprising the steps of
   providing the support member,
   roughening a surface portion of the support member by laser structuring,
   applying an adhesive to at least a part of the roughened surface portion of the support member, and
   attaching the vibrator and/or the vibratable membrane to the support member by at least a portion of the adhesive.

2. The method according to claim 1, wherein the adhesive is applied to the entire roughened surface portion of the support member.

3. The method according to claim 1, wherein the surface portion of the support member is roughened by laser structuring using a pulsed laser beam.

4. The method according to claim 1, wherein, in the laser structuring of the surface portion of the support member, the support member and a laser beam are moved relative to each other with a speed in the range from 500 mm/s to 10000 mm/s.

5. The method according to claim 1, wherein the support member is made of metal, preferably stainless steel.

6. The method according to claim 1, wherein a surface portion of the vibratable membrane is roughened by laser structuring.

7. The method according to claim 1, wherein the vibratable membrane is formed integrally with the support member.

8. A method of manufacturing an aerosol generator, the method comprising the steps of
   manufacturing a vibratable head using the method according to claim 1, and
   at least partially accommodating the vibratable head in a housing.

9. A vibratable head for an aerosol generator, the vibratable head comprising
a support member,
a vibratable membrane supported by the support member, and
a vibrator configured to vibrate the vibratable membrane, wherein
a surface portion of the support member is roughened by laser structuring,
an adhesive is applied to at least a part of the roughened surface portion of the support member, and
the vibrator and/or the vibratable membrane is attached to the support member by at least a portion of the adhesive.

10. The vibratable head according to claim 9, wherein the adhesive is applied to the entire roughened surface portion of the support member.

11. The vibratable head according to claim 9, wherein a surface portion of the vibratable membrane is roughened by laser structuring.

12. The vibratable head according to claim 9, wherein the vibratable membrane is formed integrally with the support member.

13. An aerosol generator comprising
the vibratable head according to claim 10, and
a housing,
wherein
the vibratable head is at least partially accommodated in the housing.

* * * * *

UNITED STATES PATENT AND TRADEMARK OFFICE
CERTIFICATE OF CORRECTION

PATENT NO. : 10,688,518 B2
APPLICATION NO. : 15/749847
DATED : June 23, 2020
INVENTOR(S) : Hans-Lukas Anzenberger et al.

Page 1 of 1

It is certified that error appears in the above-identified patent and that said Letters Patent is hereby corrected as shown below:

In the Claims

At Column 19, Claim 13, Line 25 should read as follows:
the vibratable head according to claim 9, and Signed and Sealed this
Eighteenth Day of August, 2020

Andrei Iancu
*Director of the United States Patent and Trademark Office*